Sept. 6, 1932.  F. B. MEWMAW  1,876,148
RAKE
Filed May 15, 1931  3 Sheets-Sheet 3
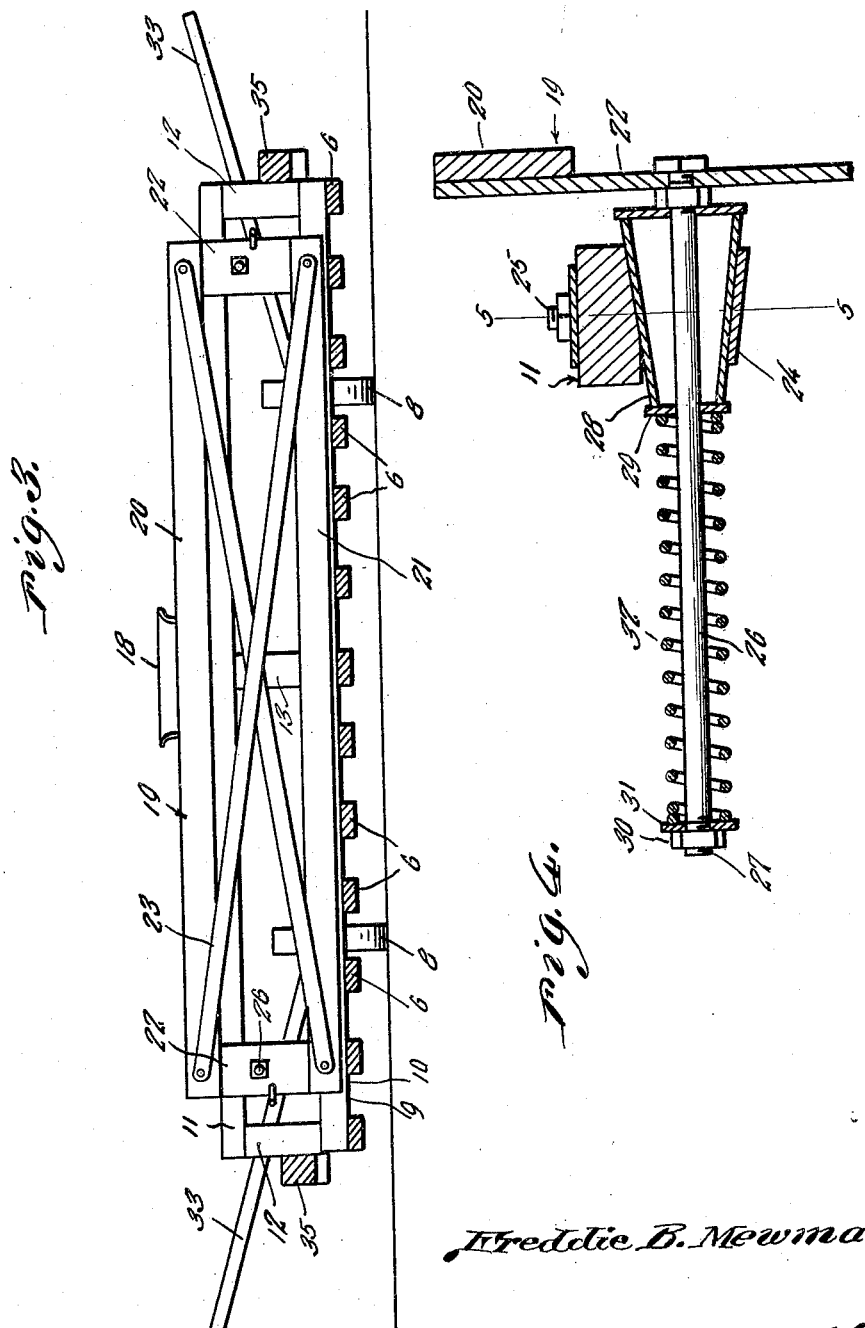
Inventor
Freddie B. Mewmaw
By Clarence A. O'Brien
Attorney Patented Sept. 6, 1932

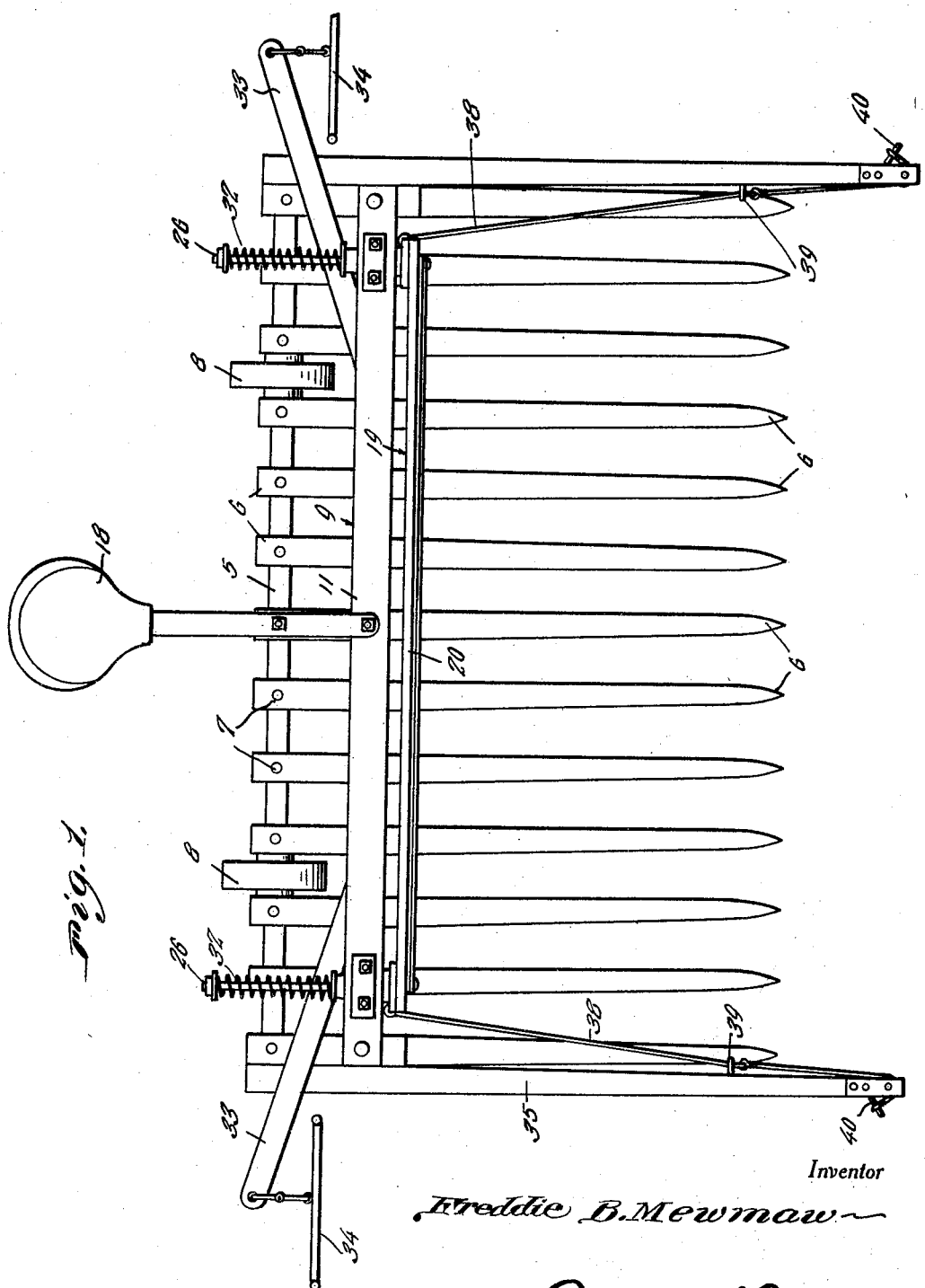

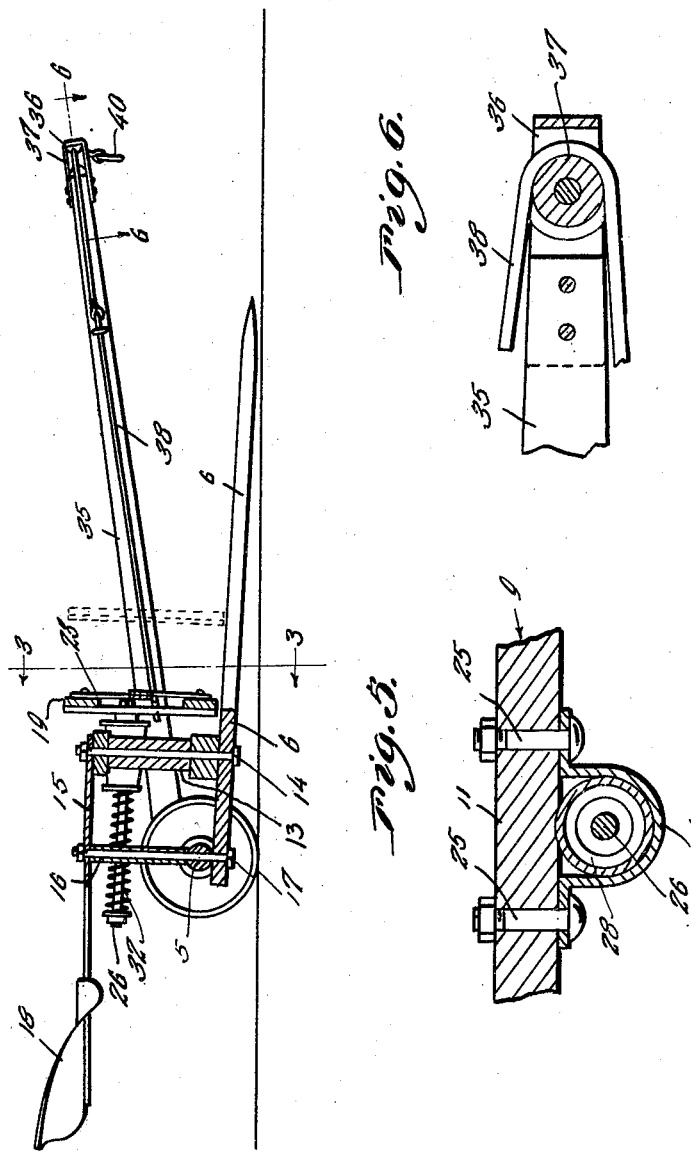

1,876,148

UNITED STATES PATENT OFFICE

FREDDIE B. MEWMAW, OF MILAN, MISSOURI, ASSIGNOR OF ONE-HALF TO PHILIP M. MARR, OF MILAN, MISSOURI

RAKE

Application filed May 15, 1931. Serial No. 537,712.

This invention appertains to new and useful improvements in the general art of harvesters, and more particularly to a novel drag rake.

The principal object of the invention is to provide a drag rake of the horse-drawn type wherein means is provided for displacing a load from the prongs thereof by the reverse pull of the horses.

Another important object of the invention is to provide a drag rake employing load displacing means which can be operated by the reverse movement of horses without any likelihood of the displacing means becoming binded because of unequal pull of the horses.

These and other important objects and advantages of the invention will become apparent to the reader of the following specification.

In the drawings:

Figure 1 represents a top plan view of the rake.

Fig. 2 represents a longitudinal sectional view through the rake.

Fig. 3 represents a sectional view taken substantially on the line 3—3 of Fig. 2.

Fig. 4 represents a longitudinal sectional view of the follower guide and tensioning means.

Fig. 5 represents a sectional view taken substantially on the line 5—5 of Fig. 4.

Fig. 6 represents a fragmentary sectional view taken substantially on the line 6—6 of Fig. 2.

Referring to the drawings wherein like numerals designate like parts, it can be seen that numeral 5 represents a stationary shaft to which the forwardly extending prongs 6 of the fork are attached by rivets or bolts 7. Interposed between certain of the prongs 6 adjacent the opposite ends of the shaft 5 are the wheels 8 rotatable on the shaft 5.

Forwardly of the shaft 5 a rectangular shaped frame 9 is secured by its lower bar 10 to the prongs 6 while its upper bar 11 is connected at its ends to the ends of the lower bar 10 by end members 12. A member 13 is interposed between the upper and lower bars 11 and 10 at their intermediate portions and a tie bolt 14 extends upwardly through the bars and thru the member 13 to secure the forward end of the spring arm 15 to the top of the bar 11.

The intermediate portion of the arm 15 is supported upon the upper end of the tubular post 16 and a tie bolt 17 extends through the arm 15 and post 16 to secure the said arm 15 to the top of the said post 16. The rear end of the arm 15 has a driver's seat 18.

Slidably disposed over the prongs 6 of the fork is the follower generally referred to by numeral 19, which includes the rectangular-shaped frame which consists of the upper bar 20, the lower bar 21 and the connecting end pieces 22. Diagonally disposed crossed brace members 23 serve also as a fabrication for the follower frame when the follower is urged against the load on the fork.

A pair of tensioning and guide means are provided for the follower and each of these tensioning and guide means consists of a shoe bracket 24 secured by its ends, as shown in Fig. 5 to the upper bar 11 of the frame 9 by bolts 25.

For each tensioning and guide means a rod 26 extends rearwardly from the follower 19, through the bracket 24 and is threaded at its rear end as at 27. A frusto-conical-shaped sleeve 28 is disposed on the rod 26 at the forward end thereof with its small end projecting rearwardly through the said bracket 24.

A washer 29 is located against the rear end of the shell 28, while a nut 30 on the threaded portion 27 of the rod 26 serves to maintain the washer 31 to urge against the compressible spring 32 which is interposed between the washer 29 and 31.

Projecting laterally in a rearwardly oblique direction from each end portion of the frame 9 is a prop 33 to which the draft bar 34 is attached. Projecting forwardly and in a forwardly inclined direction from each end of the stationary shaft 5 is a tongue 35 which as shown in Fig. 6 is provided with a U-shaped extension 36 within which the pulley 37 is mounted.

Extending from each end of the follower 19 is a cable 38, which is trained through an eye 39 on the corresponding tongue 35 and over the pulley 37 on the corresponding tongue 35.

It can thus be seen that the horses are attached to the draft bars 34 and by moving forwardly gather material onto the tines 6. When this collected material is to be discharged, the horses are attached to the strips 40 on the ends of the cables 38 and are driven rearwardly, which results in the forward motion of the follower 19, with the result that the material is discharged or forced toward a point where it can be readily displaced from the tines in the most efficient manner.

While the foregoing specification sets forth the invention in specific terms, it is to be understood that numerous changes in the shape, size and materials may be resorted to without departing from the spirit and scope of the invention as claimed hereinafter.

Having thus described my invention, what I claim as new is:

1. In a rake of the class described, a frame, a plurality of tines extending forwardly from the frame, a follower movable over said tines and having a plurality of rearwardly extending rods, frusto-conical-shaped sleeve on said rods and tapered toward the rear ends thereof, expansion springs confined between said sleeves and the rear ends of said rods, and brackets attached to said frame and having seats narrowed toward the rear ends thereof to support said sleeves.

2. In a rake of the class described, a frame, a plurality of tines extending forwardly from the frame, a follower movable over said tines and having a plurality of rearwardly extending rods, frusto-conical-shaped sleeve on said rods and tapered toward the rear ends thereof, expansion springs confined between said sleeves and the rear ends of said rods, and brackets attached to said frame and having seats narrowed toward the rear ends thereof to support said sleeves, tongues at opposite ends of said frame and having pulleys, and cables attached to the ends of said follower and trained about said pulleys.

In testimony whereof I affix my signature.

FREDDIE B. MEWMAW.